United States Patent [19]

Coakley et al.

[11] 4,255,317

[45] Mar. 10, 1981

[54] NON-DISCOLORING GLASS STRAND SIZE

[75] Inventors: Thomas A. Coakley, Heath; John E. Rubadue, Columbus; Carl E. Forman, Heath; Robert A. Schweizer, Granville, all of Ohio

[73] Assignee: Owens-Corning Fiberglas Corporation, Toledo, Ohio

[21] Appl. No.: 962,404

[22] Filed: Nov. 20, 1978

Related U.S. Application Data

[63] Continuation-in-part of Ser. No. 844,253, Oct. 21, 1977, abandoned, which is a continuation of Ser. No. 741,181, Nov. 12, 1976, abandoned.

[51] Int. Cl.$^3$ ............................................... C08K 9/06
[52] U.S. Cl. ........................ 260/37 N; 260/29.2 TN; 428/391
[58] Field of Search ....... 260/37 N, 29.2 TN, 29.2 M; 428/392, 394, 391

[56] References Cited

U.S. PATENT DOCUMENTS

| 3,401,133 | 9/1968 | Grace et al. ................. 260/29.2 TN |
| 3,803,069 | 4/1974 | McWilliams et al. ......... 260/37 N X |

FOREIGN PATENT DOCUMENTS 2300368   7/1973   Fed. Rep. of Germany .

*Primary Examiner*—Sandra M. Person
*Attorney, Agent, or Firm*—Ronald C. Hudgens; Philip R. Cloutier; James B. Wilkens

[57] ABSTRACT

A non-discoloring glass strand size comprises a thermoplastic polyurethane emulsion produced by the chain extension of an NCO-terminated prepolymer, which prepolymer is prepared by the reaction of an aliphatic or cycloaliphatic diisocyanate with a polyalkylene ether polyol and is particularly suitable for glass incorporated in polyamide resins.

16 Claims, No Drawings

NON-DISCOLORING GLASS STRAND SIZE

This application is a continuation-in-part of our application Ser. No. 844,253 filed Oct. 21, 1977, and now abandoned, which in turn was a continuation of our application Ser. No. 741,181 filed Nov. 12, 1976 and also now abandoned.

This invention relates to a non-discoloring glass strand sizing.

In one of its more specific aspects, this invention pertains to sizing for glass used for incorporation in polyamides.

Glass reinforced polyamides, such as nylon, are presently being injection molded into many articles in the automotive and appliance industry. To obtain the best improvement in properties, the composition with which the glass is sized must be compatible with the polyamides.

It is known that polyurethanes based on aromatic diisocyanates provide sizes having outstanding adhesion between glass and polyamides. However, such sizes have a tendency to discolor laminates produced from the resulting glass-reinforced nylons, the laminates not possessing a white color but rather a green or brown discoloration. A large number of these polyurethanes are based on toluene derivatives such as toluene diisocyanate, an aromatic diisocyanate whose use results in discolored laminates.

It has now been discovered that glass sizes suitable for use on glass strand incorporated in polyamides can be produced by employing therein polyurethanes based on aliphatic or cycloaliphatic diisocyanates. The employment of the latter materials largely eliminates such discoloration while not adversely affecting the quality of the finished product.

According to this invention, there is provided a glass size composition comprising an aqueous mixture of (1) a thermoplastic polyurethane emulsion produced by the chain extension of an NCO-terminated prepolymer prepared by the reaction of an aliphatic or cycloaliphatic diisocyanate with a polyalkylene ether polyol, (2) a silane coupling agent and, optionally, (3) a lubricant.

Also, according to this invention, there is provided a glass fiber having at least a portion of its surface in contact with the dried residue of an aqueous composition comprising (1) a thermoplastic polyurethane emulsion produced by the chain extension of an NCO-terminated prepolymer prepared by the reaction of an aliphatic or cycloaliphatic diisocyanate with a polyalkylene ether polyol, (2) a silane coupling agent and, optionally, (3) a lubricant.

This invention also provides polyamide resins reinforced with glass fibers sized with the size of this invention.

A particularly suitable thermoplastic polyuethane emulsion based on aliphatic or cycloaliphatic diisocyanates, employable in this invention, is designated X1042H, commercially available from BASF Wyandotte, Wyandotte, Michigan. U.S. Pat. Nos. 3,401,133 and 3,563,943 describe in detail the preparation of X1042H and are incorporated herein by reference.

The thermoplastic aliphatic polyurethane emulsion can be employed in the size in an amount within the range of from about 3 to about 20 parts per 100 parts by weight.

Any suitable coupling agent comprising an organo silane can be employed. Preferably an organo silane such as gamma-aminopropyltrimethoxysilane will be used. A suitable coupling agent of this type designated A1100 is available from Union Carbide.

A coupling agent can be employed in the size in an amount within the range of from about 0.2 to about 4 parts per 100 parts by weight.

Any suitable lubricant can be employed. A preferred lubricant is a cationic reaction product of morpholine and a sulfonic acid. This material will have a specific gravity of about 1, a viscosity of about 500 cps. at 25° C. and a pH (5% aqueous solution) of from about 5.5 to about 7. A preferred lubricant of these characteristics is available from Emery Industries as Emerstat 6665. Another suitable lubricant is an amide substituted polyethyleneimine such as Emery 6717 available from Emery Industries.

The lubricant can be employed in the size in an amount up to about 5 parts per 100 parts by weight.

The size of this invention can be prepared by conventional methds such as described below. It can be applied to any glass fibers conventionally employed as molding compound reinforcement, being applied during the forming operation such that the fibers are coated with, after drying to remove water, size solids within the range of from about 0.3 to about 2.0 weight percent as determined by loss on ignition.

The best mode known by the inventors for carrying out the invention is demonstrated by the following examples.

EXAMPLE I

This example demonstrates the preparation of approximately 100 gallons of a size composition of this invention.

About 40 gallons of demineralized water were added to a main mix tank.

About 8 pounds of gamma-aminopropyltrimethoxysilane (Union Carbide A1100) were mixed with about 10 gallons of demineralized water in a first premix kettle until the resulting solution was clear (about 10 minutes) and the solution was introduced into the contents of the main mix tank.

About 65 pounds of thermoplastic aliphatic polyurethane emulsion (X1042H) were mixed with about 20 gallons of demineralized water in a second premix kettle for about 10 minutes and the resulting mixture was introduced into the contents of the main mix tank.

The contents of the main mix tank after complete mixing (about 15 minutes) had a solids content of about 4.7 weight percent and a pH of about 9.

The size prepared in the above manner was applied to individual glass fibers at conventional application methods and rates such that the size solids on the strand after drying amounted to about 0.6 weight percent.

EXAMPLE II

This example demonstrates the preparation of approximately 100 gallons of a size composition of this invention.

About 25 gallons of demineralized water were added to a main mix tank.

About 8.3 pounds of gamma-aminopropyltrimethoxysilane (Union Carbide A1100) were mixed with about 20 gallons of demineralized water in a first premix kettle until the resulting solution was clear (about 10 minutes) and the solution was introduced into the contents of the main mix tank.

About 45.9 pounds of thermoplastic aliphatic polyurethane emulsion (X1042H) were mixed with about 20 gallons of demineralized water in a second premix tank for about 10 minutes and the resulting mixture was introduced into the main mix tank.

About 8.3 pounds of lubricant (Emery 6665) were mixed with about 10 gallons of demineralized water in a third premix kettle for about 10 minutes and the resulting mixture was introduced into the main mix tank.

The contents of the main mix tank after complete mixing (about 10 minutes) had a solids content within the range of from about 2.5 to about 4.5 weight percent and a pH within the range of from about 9 to about 10.

The size prepared in the above manner was applied to individual glass fibers at conventional application methods and rates such that the size solids on the strand after drying amounted to about 0.6 weight percent.

EXAMPLE III

This example demonstrates the preparation of a molded article reinforced with glass fibers sized with the size composition of Example I.

The size composition of Example I was applied to 816 "E" glass fibers having diameters of from about 0.00050 to about 0.00055 inch at forming using a roll-type applicator. The sized fibers were collected in the form of a strand. The strand was wound into a forming package. The size solids on the strand after drying amounted to about 0.6 weight percent.

Fifty forming packages of the sized strand were placed on a creel and the strands from the fifty packages were brought together through guide eyes and chopped to ¼ inch length fibers. The chopped strand was then dried in a fluidized bed oven at 400° F. for 1 minute. The resultant material was then screened to remove off-specification lengths.

About 3 parts by weight of this chopped strand were placed in a drum tumbler with about 7 parts by weight of nylon 6,6 having a melt index of 2 and a molecular weight of about 100,000. The resulting mixture was then placed in a 2½ inch Prodex Machine Screw Extruder and electrically heated to about 540° F. The mixture was extruded into ⅛ inch diameter cylindrical rods which were introduced into a Cumberland Pelletizer to form ¼ inch long pellets. The pellets were, in turn, fed into an injection molding machine at a temperature of about 550° F. and formed into a standard ASTM D-638 dog bone test sample.

The test sample was white in color and found to have a tensile strength of about 25,000 psi., a modulus of elasticity of $1.2 \times 10^6$ psi. and an IZOD notched impact strength of 3.0 ft. pounds/inch.

The same method and formulation was used to prepare comparative molded specimens where the X1042H polyurethane was replaced by an aromatic polyurethane having blocked isocyanate groups, an aliphatic polyurethane having blocked isocyanate groups or an aromatic thermoplastic polyurethane, respectively D609 and D641M from Nopco Chemical Company and X1042 from BASF Wyandotte. The results were as follows:

| Polyurethane | Color |
|---|---|
| D609 | Gold |
| D641M | Lt. Yellow |
| X1042 | Med. Yellow |

-continued

| Polyurethane | Color |
|---|---|
| X1042H | White |

The measured tensile strengths of all four specimens were substantially the same.

It will be evident from the foregoing that various modifications can be made to the present invention. Such, however, are considered as being within the scope of the invention.

What is claimed is:

1. A glass fiber having at least a portion of its surface in contact with the dried residue of an aqueous composition comprising:
   (a) an emulsion of a thermoplastic aliphatic polyurethane produced by the chain extension of an NCO-terminated prepolymer prepared by the reaction of an aliphatic or cycloaliphatic diisocyanate with a polyalkylene ether polyol, and
   (b) a silane coupling agent.

2. The glass fiber of claim 1 in which said composition also comprises a lubricant.

3. The glass fiber of claim 2 in which said lubricant is a cationic condensation product of morpholine and a sulfonic acid.

4. The glass fiber of claim 2 in which said lubricant is employed in said aqueous composition in an amount up to about 5 parts per 100 parts by weight.

5. The glass fiber of claim 1 in which said silane coupling agent is gamma-aminopropyltrimethoxysilane.

6. The glass fiber of claim 1 in which said silane coupling agent is employed in said aqueous composition in an amount within a range of from about 0.2 to about 4 parts per 100 parts by weight.

7. The glass fiber of claim 1 in which said polyurethane emulsion is employed in said aqueous composition in an amount within a range of from about 3 to about 20 parts per 100 parts by weight.

8. A glass size composition comprising:
   (a) an emulsion of a thermoplastic aliphatic polyurethane produced by the chain extension of an NCO-terminated prepolymer prepared by the reaction of an aliphatic or cycloaliphatic diisocyante with a polyalkylene ether polyol, and
   (b) a silane coupling agent.

9. The glass size composition of claim 8 also comprising a lubricant.

10. A body of reinforced polyamide resin wherein said reinforcement comprises at least one glass fiber according to claim 1.

11. A body of reinforced polyamide resin wherein said reinforcement comprises at least one glass fiber according to claim 2.

12. A body of reinforced polyamide resin wherein said reinforcement comprises at least one glass fiber according to claim 3.

13. A body of reinforced polyamide resin wherein said reinforcement comprises at least one glass fiber according to claim 4.

14. A body of reinforced polyamide resin wherein said reinforcement comprises at least one glass fiber according to claim 5.

15. A body of reinforced polyamide resin wherein said reinforcement comprises at least one glass fiber according to claim 6.

16. A body of reinforced polyamide resin wherein said reinforcement comprises at least one glass fiber according to claim 7.

* * * * *